United States Patent [19]
Bailey et al.

[11] Patent Number: 5,833,992
[45] Date of Patent: Nov. 10, 1998

[54] NATIVE HERBAL COVERSCENT

[76] Inventors: William L. Bailey; Cheryl L. Bailey, both of 4725 Hyway 21, Atmore, Ala. 36502

[21] Appl. No.: 847,637

[22] Filed: Apr. 25, 1997

[51] Int. Cl.$^6$ .............................. A61K 7/46; A01M 31/00
[52] U.S. Cl. ................................................ 424/195.1; 43/1
[58] Field of Search .......................................... 424/195.1

[56] References Cited

U.S. PATENT DOCUMENTS

| | | | |
|---|---|---|---|
| 4,933,177 | 6/1990 | Grollier et al. | 424/195.1 |
| 5,033,446 | 7/1991 | Bradt | 124/26 |
| 5,106,623 | 4/1992 | Mori et al. | 424/195.1 |
| 5,303,496 | 4/1994 | Kowalkowski | 43/1 |
| 5,327,667 | 7/1994 | Fore | 43/1 |
| 5,585,107 | 12/1996 | Vickers | 424/402 |

*Primary Examiner*—Peter F. Kulkosky

[57] ABSTRACT

A water based solution consisting of extract of the plant *Anaphalis magaritacea* (Pearly Everlasting) and Prunus (Cherry tree). The solution provides an effective mask of human scent for use by deer hunters. The scent of the solution effectively prevents the deer from detecting the hunter's presence.

1 Claim, No Drawings

NATIVE HERBAL COVERSCENT

BACKGROUND OF THE INVENTION

Deer hunting is an increasingly popular sport with over 20 million enthusiasts in the United States of America. With the increasing number of deer hunters nationwide the demand has increased for more effective products to provide the hunters an advantage over the keen senses of the deer. Many new products are related to the stimulation of the visual, olfactory and auditory senses of the deer. This wide variety of products are designed primarily to stimulate these senses and attract the deer.

However, the successful hunter must not only be able to lure the prey but also must disguise the stimulants that are repulsive to the deer. While the current products provide an advantage in that deer are attracted under certain conditions, a better method of disguising the repulsive effects of human scent was needed. Thus there exists a definite need for a product that can be applied by the hunter that can mask the human scent preventing detection by the deer. Further a coverscent was needed which was in abundant supply and was relatively low cost.

BRIEF SUMMARY OF THE INVENTION

The invention herein comprises a product which masks or disguises the human scent enabling hunters to avoid detection by the olfactory senses of the deer. It has been determined that a water-based solution consisting of extracts from the plant *Anaphalis margaritacea* (Pearly Everlasting) and the bark of the tree Prunus (Wild Cherry of any species) provides an extremely effective mask to the human scent. This water based solution provides a simple, abundant, inexpensive and easily applied coverscent.

DETAILED DESCRIPTION OF THE INVENTION

This invention provides a solution for application to human skin, apparel or equipment to mask human scent.

As used herein, "mask," means to provide a scent which predominates over the natural human scent preventing deer from detecting the presence of the human. Ultimately, "masking" is meant to release a scent such that scents which are repulsive to a deer (such as the natural human scent) are not detectable by the deer.

The invention is comprised of a water based solution of extracts from the plant *Anaphalis Margaritacea* (Pearly Everlasting) and bark from the tree Prunus (Cherry tree of any species). Equal portions of Anaphalis and Prunus, approximately 16 ounces each, are brought to a boil in one gallon of water.

After boiling, the solution is strained, revealing the natural coverscent. The hunter can then apply the liquid. The scent of the Anaphalis and Prunus combine to cover the human scent when applied to skin, clothes or equipment.

Both Anaphalis and Prunus (of numerous species) are found in abundance, growing naturally in the forests of the southern United States. Harvest is easily accomplished.

We claim:

1. A water based solution consisting of extract from *Anaphalis magaritacea* and Prunus, said solution providing a mask of the human scent preventing detection by the olfactory senses of the deer.

\* \* \* \* \*